United States Patent
Rueb

(10) Patent No.: US 11,022,554 B2
(45) Date of Patent: Jun. 1, 2021

(54) DETECTION OF FLUORESCENCE OF FOREIGN MATERIALS

(71) Applicant: Virtek Vision International ULC, Waterloo (CA)

(72) Inventor: Kurt D. Rueb, Kitchener (CA)

(73) Assignee: VIRTEK VISION INTERNATIONAL ULC, Waterloo (CA)

(*) Notice: Subject to any disclaimer, the term of this patent is extended or adjusted under 35 U.S.C. 154(b) by 0 days.

(21) Appl. No.: 16/376,463

(22) Filed: Apr. 5, 2019

(65) Prior Publication Data

US 2019/0310196 A1    Oct. 10, 2019

Related U.S. Application Data

(60) Provisional application No. 62/653,890, filed on Apr. 6, 2018.

(51) Int. Cl.
*G01N 21/64* (2006.01)

(52) U.S. Cl.
CPC ..... *G01N 21/6456* (2013.01); *G01N 21/6428* (2013.01); *G01N 2021/646* (2013.01); *G01N 2021/6463* (2013.01); *G01N 2201/06113* (2013.01)

(58) Field of Classification Search
CPC ........... G01N 21/6456; G01N 21/6428; G01N 2021/646; G01N 2021/6463; G01N 2201/06113
See application file for complete search history.

(56) References Cited

U.S. PATENT DOCUMENTS

| | | | |
|---|---|---|---|
| 6,407,810 B1* | 6/2002 | Liu | G01N 21/6447 356/237.4 |
| 6,597,439 B1* | 7/2003 | Hakamata | G01N 21/47 356/218 |
| 9,200,899 B2* | 12/2015 | Rueb | G01C 11/00 |
| 2006/0108048 A1* | 5/2006 | Engelbart | B29C 70/38 156/64 |
| 2008/0289742 A1* | 11/2008 | Engelbart | B29C 70/38 156/64 |
| 2017/0122871 A1* | 5/2017 | Meer | G01N 21/8851 |
| 2017/0348958 A1* | 12/2017 | Van Voast | B29C 66/0224 |
| 2018/0000011 A1* | 1/2018 | Schleusner | G06T 7/0004 |

* cited by examiner

*Primary Examiner* — Christine S. Kim
(74) *Attorney, Agent, or Firm* — Gregory D. DeGrazia; Miller, Canfield, Paddock & Stone, PLC

(57) ABSTRACT

A method of detecting a presence of foreign material in a ply is disclosed. A source of foreign material is marked with a fluorescent indicator. The source of foreign material is separated from the ply. An illumination source is provided for illuminating the ply at a different wavelength than the fluorescent indicator fluoresces so that the ply reflects light at a different wavelength. A sensor detects illumination of the ply and fluorescent indicator included in the foreign material disposed upon the ply. Differences in light reflected from the ply and fluorescence of the indicator disposed in the foreign material are detected thereby identifying existence of the foreign material in the ply.

13 Claims, 5 Drawing Sheets

DETECTION OF FLUORESCENCE OF FOREIGN MATERIALS

PRIOR APPLICATIONS

The present application claims priority to U.S. Provisional Patent Application No. 62/653,890 filed Apr. 6, 2018, the contents of which are included herein by reference.

TECHNICAL FIELD

The present application relates generally toward detection of foreign material adhered to an assembly piece during an assembly process. More specifically, the present application relates toward an improved method of detection of foreign material using fluorescence incorporated into a known source of foreign material for improving the ability to distinguish the foreign material from the assembly piece.

BACKGROUND

In many highly technical manufacturing processes the unintentional inclusion of foreign material contaminating a part or workpiece being manufactured could render the part unusable due to a possibility of catastrophic failure. For example, when constructing composite parts, multiple layers of ply made from composite material, such as, for example, fiber impregnated, polymers are applied to a mandrel for forming the composite part. Often, woven fibrous material including, but not limited to carbon fiber and equivalents impregnate epoxy or similar resins to form a sheet of ply. The ply is formed upon a backing paper and pre-cut into a desired shape forming an assembly piece prior to delivery to an assembly facility.

Prior to overlaying each piece of ply to form the composite part, the backing paper is separated from the assembly piece. After removal, multiple layers of the ply are laid over the mandrel to form the composite part. A known source of contamination is particles or small pieces of the backing paper that either do not release from the piece or fall onto the piece after removal. This can result in pieces of the backing paper being trapped in between layers of ply. This contamination can result in catastrophic failure of the composite part. Once trapped between layers of ply, it becomes difficult to remove the contamination. After assembly, the composite part is sometimes tested using thermal or ultrasonic methods. However, detecting such contamination after assembly often requires a composite part be scrapped at great expense.

Attempts have been made to identify contamination from known sources by analyzing images collected from cameras viewing the assembly of the composite part. One such example is disclosed in U.S. Pat. No. 6,064,429 in which the disclosed assembly makes use of a color video camera to view a work surface and endeavors to distinguish foreign material from a work surface based upon differences in color. When identified, the location of the contamination is indicated to an operator. This system has not proven affective due to the difficulty in distinguishing the often flat black, composite ply from even colored contamination.

A further attempt to identify contamination on a work surface is disclosed in United States Patent Application Publication No. 20160061746, which attempts to compare scenes with and without contamination using a color classifier. This method also fails to adequately distinguish contamination from the flat black composite background.

One additional drawback of these methods is the inability to achieve sufficient contrast between the contamination materials and the material making up the ply. Many ply materials used during assembly include carbon fiber impregnated polymers, fiberglass, Kevlar and other composites. Revisions in material formulation and impregnation amounts merely based upon manufacturing variability can also cause inability to distinguish the ply material from the contamination. In addition, ambient light is not accounted for. The detection of color is dependent upon the color balance of ambient light in the environment on adjacent sources of reflection. The color of proximate material, including operator clothing, reflective targets and the like can trigger false contamination alarms.

Balancing the detection of even very small particle of contamination against the adverse reduction in production throughput due to false detection of contamination has proven elusive. None of the camera based systems have proven sufficient to assure contaminants are not trapped between layers of ply. Merely relying on the visible light spectrum to distinguish contaminants from composite materials has rendered many of these systems inoperable. Therefore, it would be desirable to develop a method of identifying contamination from known sources, such as, for example, backing paper, gloves and related items prior to mating a layer of ply to a workpiece while providing highly accurate results.

SUMMARY

A method of detecting a presence of foreign material in a ply is disclosed. A source of foreign material is marked with a fluorescent indicator. The source of foreign material is separated from the ply. An illumination source for illuminating the ply is provided so that the ply reflects light at a different wavelength than the fluorescent indicator fluoresces. A sensor for detecting illumination of the ply and fluorescent indicator included in the foreign material disposed upon the ply is provided. Differences in light reflected from the ply and fluorescence of the indicator disposed in the foreign material are identified for locating and identifying existence of the foreign material in the ply.

The invention of the present application detects fluorescent material with a high degree of accuracy due to the high contrast between the fluorescence of the dye against the flat black, and event matted composite material when illuminated at a desirable wavelength. Fluorescent dye may be added to backing paper, gloves, or any other material known to result on unwanted contamination that sandwiched between layers of ply. Once a piece of ply is ready to be applied to a mandrel or pre-existing layer of ply, the backside of the ply is subject to illumination and scanning with a camera sensor. Illumination of, for example even very small pieces of contamination treated with orange fluorescent material and illuminated with a light source having a desirable wavelength enable the camera sensor to easily detect the contamination.

BRIEF DESCRIPTION OF THE DRAWINGS

Other advantages of the present invention will be readily appreciated as the same becomes better understood by reference to the following detailed description, when considered in connection with the accompanying drawing, wherein.

DETAILED DESCRIPTION

Figure 1:
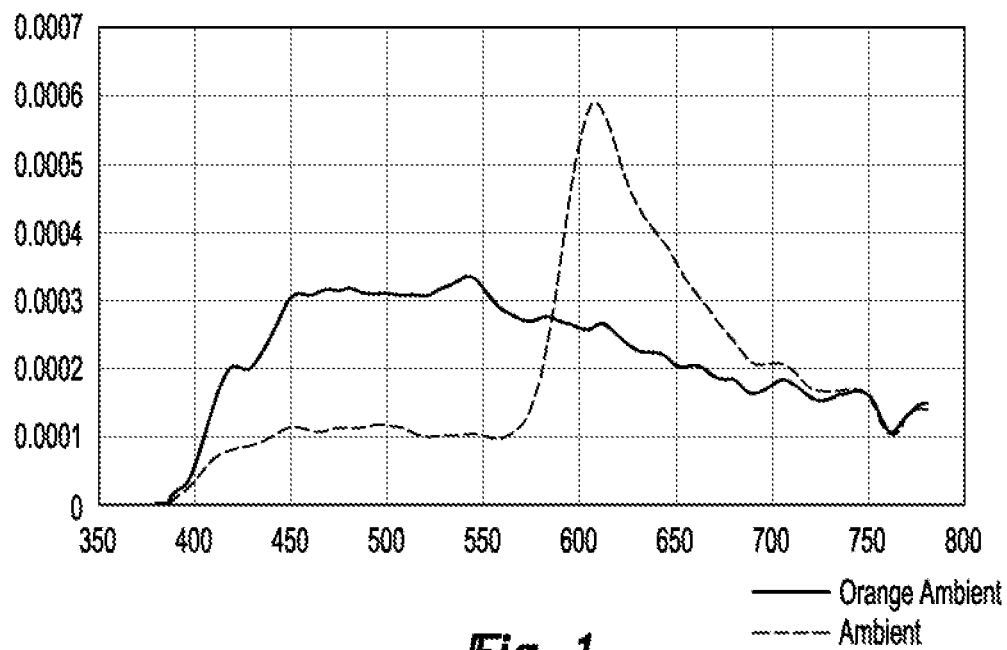
FIG. 1 shows a comparison of illumination of fluorescent material comparing orange fluorescent material with non-fluorescent material both being illuminated with ambient light.

The invention of the present application overcomes existing methods of foreign object detection by exciting fluorescent dye, or an equivalent that has been added to known sources of contamination or foreign objects, such as, for example backing paper, work gloves, protective work clothing, and the like. Unlike traditionally colored materials that absorb certain portions of ambient light, fluorescent materials absorb incidental light and emit incidental radiation at a wavelength that differs from the wavelength of the illuminating light. For example, as best represented in FIG. 1, orange fluorescent material absorbs ambient light at wavelengths below about 575 nm and re-emits fluorescence at longer wavelengths with peak fluorescence at about 606 nm. The peak fluorescence at 606 nm provides the ability to better distinguish fluorescent objects from non-fluorescent objects.

Figure 2:
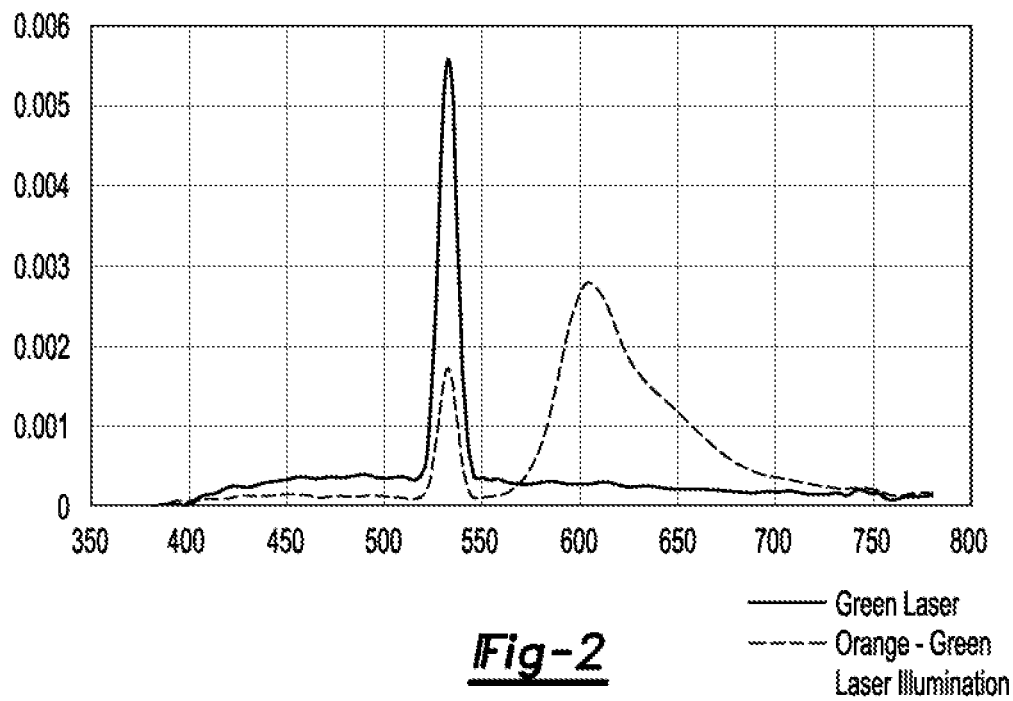
FIG. 2 shows a comparison of illumination of fluorescent material and non-fluorescent material with a green laser with exposure to ambient light.

Additional distinguishing benefits are achieved when the fluorescent material is illuminated by an illumination source having a wavelength outside the fluorescent wavelength band. For example, illuminating fluorescent material such as, for example, orange fluorescent material with a laser projecting in the green spectrum or light emitting diode (LED) illuminating in a non-orange spectrum. Illumination of fluorescent material using an illumination source generating light outside the fluorescent band of the fluorescent material provides the ability to separate the illuminating light from the fluorescence of the fluorescent material. As represented in FIG. 2, a green laser (or green LED source) used to illuminate orange fluorescent material provides an emission response that is clearly differentiated. The green laser provides peak value at about 535 nm while the orange fluorescence, when illuminated with a green source peaks between about 606 nm. A fluorescence peak at 606 nm provides favorable distinguishing characteristics enabling an improved sensor detection of contamination in a piece of ply by distinguishing the light reflected from non-fluorescent materials.

Further accuracy in detecting contamination is achieved by filtering ambient illumination. When discounting ambient illumination, the fluorescence of the fluorescent material becomes even more pronounced. In this manner, even very small pieces or particles of contamination treated with the fluorescent dye can be reliably detected. As best represented FIG. 3, removal of the ambient light provides a clear a substantially more clear separation between the excitation light source (green laser or LED) and the corresponding responsive fluorescence than previously thought possible.

Figure 4:
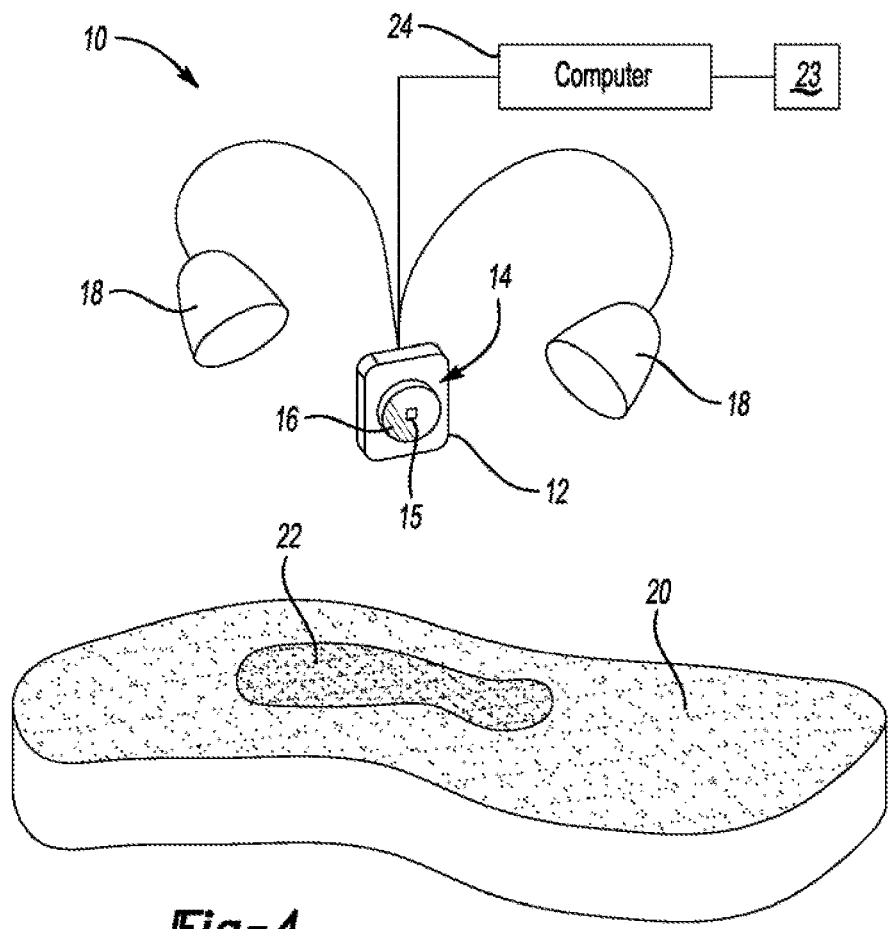
FIG. 4 shows a schematic of a first embodiment of the invention of the present application showing a generic illumination system.

Referring now to FIG. 4, a first embodiment of the detection assembly of the present invention is generally shown at 10. The assembly 10 includes a camera 12 with a lens 14 and a shutter 16. A light sensor 15 (not shown) is included in the camera 12. In one embodiment, the sensor 15 is a CMOS sensor. In an alternative embodiment the sensor 15 is a CCD sensor. Other types of sensors 15 are also within the scope of this invention. An illumination source 18 illuminates a workpiece, in this example, a composite ply 20 of a layup. Multiple illumination sources may be used to excite the fluorescent material. In one embodiment the illumination source is a laser having a different wavelength than the excitation wavelength of the fluorescent dye used to mark the contamination material 22. While a laser based illumination source 18 is discussed in further detail herein below, it should be understood that the invention of the present application include alternative sources of illumination including, but not limited to LED illumination, and even combinations of illumination sources. Accuracy improves significantly when illumination is outside the wavelength of the fluorescent spectrum.

The illumination source 18 is electronically linked via computer 24, or directly, to the camera 12. The camera lens 14, shutter 16, and image capture are synchronized with the illumination system 18 to interleave capture of images. Interleaved image capture of images with and without excitation of the fluorescent material 22 by the illumination system allows the computer 24 to subtract the any excitation of the fluorescent material 22 by ambient light. This provides for the isolation of the excitation of the fluorescent material 22 by the illumination system 18. In one embodiment, interleaving is conducted at a rate that is imperceptible to an operator. Therefore, the image capture occurs at the same rate as an illumination pulse or flash by the illumination source 18, in this embodiment, contemplated to be a light emitting diode (LED) flash or pulse. Further, emission signals (fluorescence) from multiple image captures are averaged to improve the sensitivity and reliability of contamination detection.

In one embodiment, the camera 12 includes a "rolling" shutter 16 having an illumination strobe rate that is a fraction of an image capture rate by the sensor 15 to produce illumination bands with the captured image. By using a reduced duty cycle for the strobe illumination by the illumination system 18, the power of the strobe illumination is much greater than the brightness of the illumination perceived by the operator. Therefore, when the illumination occurs at a much higher rate than the entire image capture, the illumination occurs in "bands" when the imaging when the strobe flash is activated. During the instant the strobe occurs, the illumination is substantial when compared to ambient illumination, but the operator only perceives the average illumination power so that the illumination does not appear excessively bright. This phenomenon is particularly true when the illumination bands include only one half or one quarter of the total image capture period. This strategy improves operator viewing comfort without any reduction in detection sensitivity by the sensor 15 and camera 12.

As set forth above, it is desirable to isolate fluorescent emissions upon illumination. To assist isolation, a monochromatic camera (or plurality of cameras) is included using optical filters to isolate the wavelength of the excitation energy from the emitted fluorescence from the fluorescent material in the chosen fluorescent emission wavelength. In an alternative embodiment, selecting compatible wavelengths provide the ability to use a filter grid of a standard color camera to separate the fluorescent wavelengths from the illumination (excitation) wavelengths. For example, a green laser generating excitation light having a wavelength of 520 nm is easily filterable from orange fluorescent emission having a wavelength of 606 nm.

In an alternative embodiment, the assembly 10 operates continuously until no further excitation of fluorescent material is detected and the computer and/or operator determine all of the contamination has been separated from the ply 20. The camera 12 includes the ability to detect a signal by an operator to initiate a detection sequence by way of hand gesture, physical switch, interface on a handheld tablet or other remote control device, including but not limited to augmented reality goggles (not shown). The illumination system 18 is powered on and continues illumination of the ply 20 until the foreign material 22 by way of fluorescence is no longer detected. While fluorescence is detected, the camera 12 sensor 15 continues to transmit a view of the ply 20 to a monitor 23, such as, for example a fixed monitor, a handheld device, smartphone, template, or event augmented reality goggles. The operator may also override illumination when contamination detected by the camera 12 sensor 15 is considered de minimis.

Figure 5:
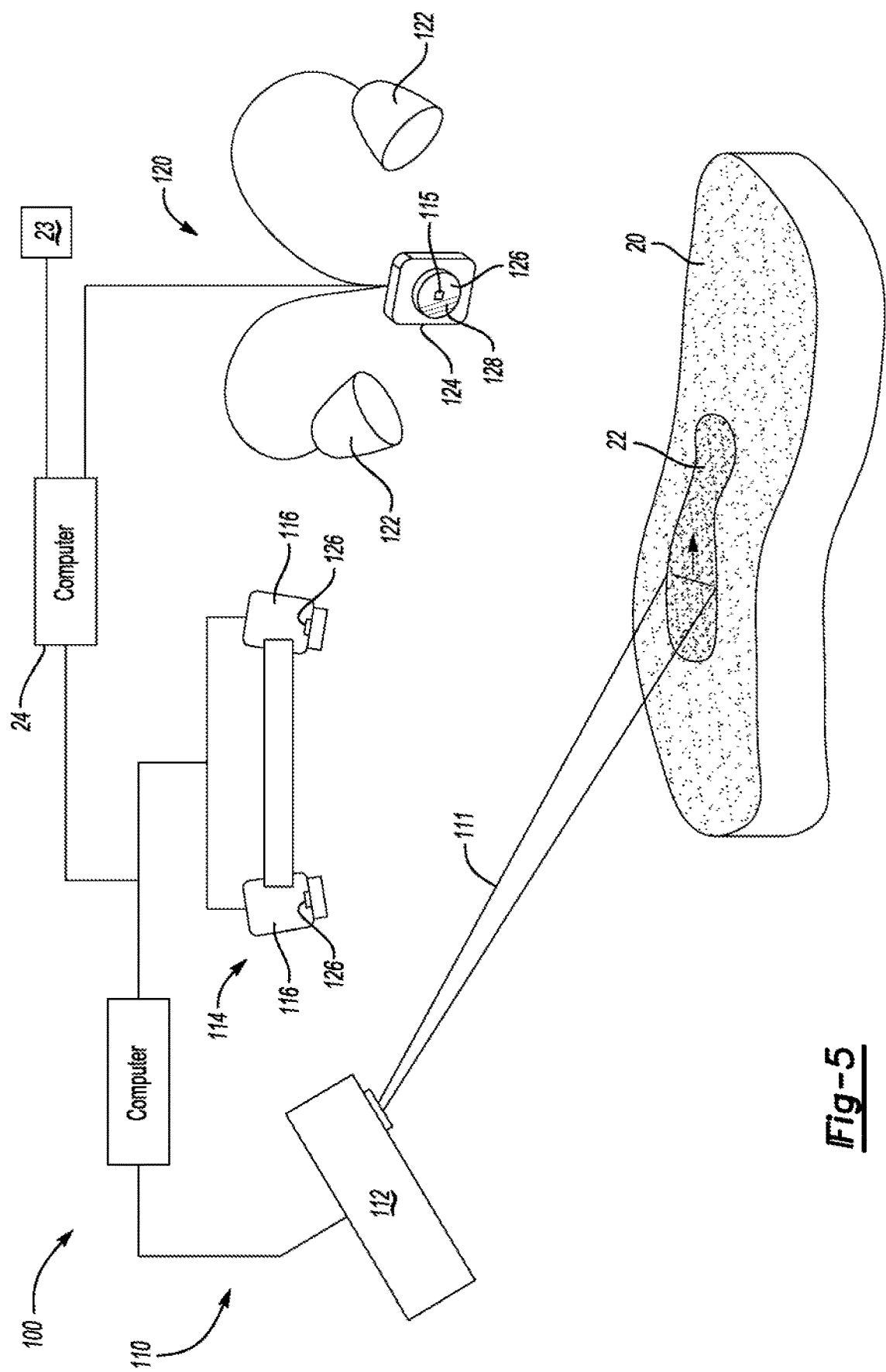
FIG. 5 shows a schematic of a second embodiment of the invention of the present application showing a generic illumination system in combination with a laser projector.

An alternate embodiment is shown in FIG. 5 generally at 100. The alternate embodiment 100 integrates an optical layup laser projection system 110 similar to the system disclosed in U.S. Pat. No. 9,200,899, the contents of which are included herein by reference. The projection system 110 includes a laser projector 112 and a photogrammetry assembly 114. The optical layup system 110 projects laser templates upon an assembly tool or workpiece to provide an operator a location at which each sequential piece of ply is to be placed. As is disclosed in the U.S. Pat. No. 9,200,899, the photogrammetry assembly 114 locates the assembly tool or workpiece and signals the computer 24 to where to project the laser template based upon computer aided design (CAD) models. The photogrammetry assembly 114 includes one or more photogrammetry cameras 116 that can also detect fluorescence when contamination is illuminated. However, it should also be understood that the optical layup system 110 remains separate from the illumination system relying on separate cameras 116. In this embodiment, the photogrammetry assembly 114 communicates with the laser projector 112 via computer 24 to coordinate laser illumination with shutter 118 speed, image capture, etc.

Figure 7:
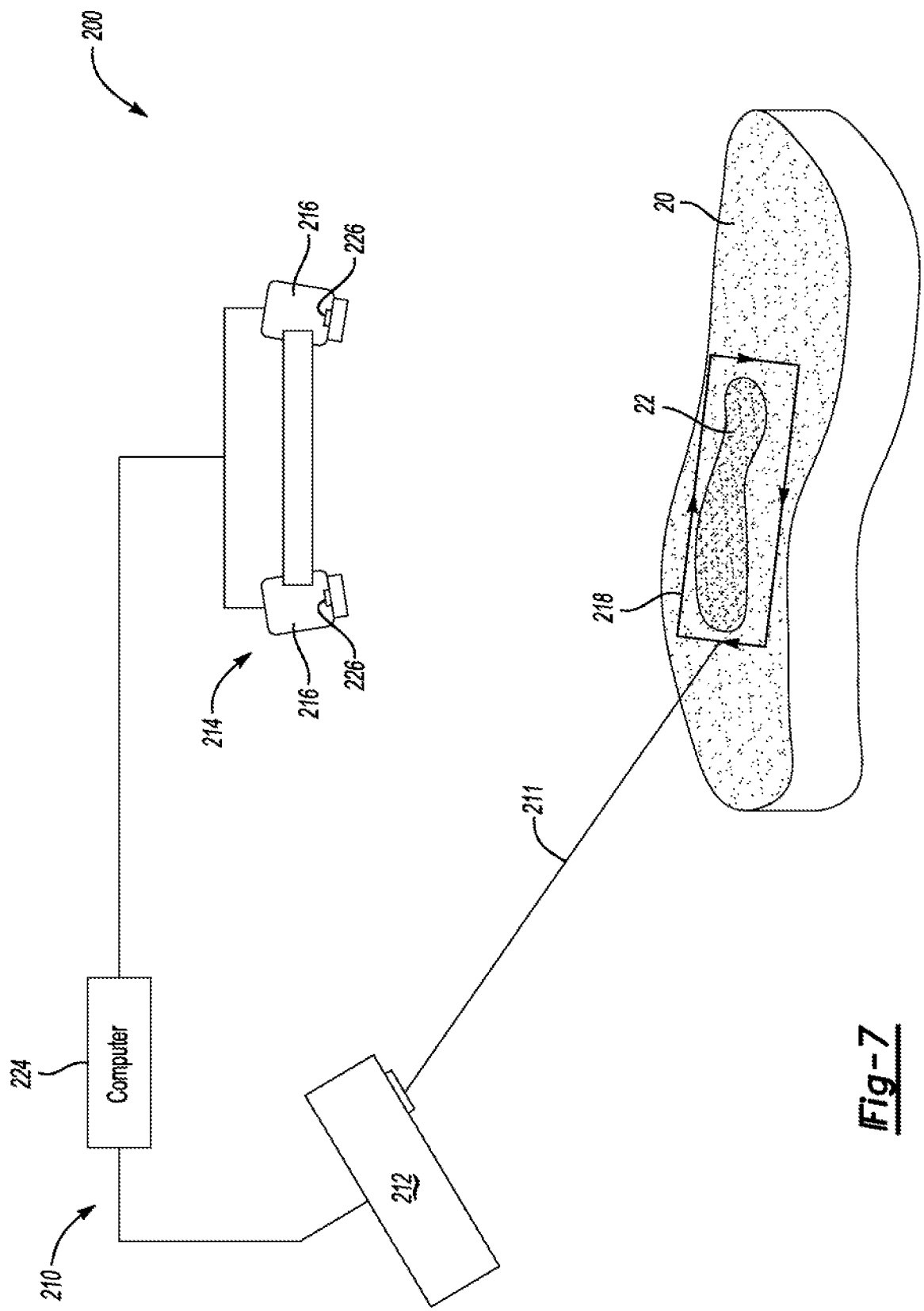
FIG. 7 shows a schematic of the third embodiment of the invention of the present application using a laser beam to outline contamination material.

One additional advantage of the alternative embodiment shown in FIG. 7 is that the laser projection system 110 identifies the exact location at which a part is or ply is to be place. Therefore, the computer 24 directs the camera 124 precisely where to search for contamination when searching on mandrel or work surface for contamination. This provides the ability for the computer 24 to ignore contamination that is not disposed in a critical area, such as, for example, a staging area. The ability to distinguish critical contamination from non-relevant contamination provides for additional manufacturing efficiency. In addition, when scanning with a laser beam 111 to illuminate fluorescent material, process times are reduces by directing the laser scanning to the exact area of interest.

The laser projector 112 cooperates with photogrammetry assembly 114 and the detection assembly 120. The detection assembly 120 includes secondary illumination system 122 that either illuminates the ply 20 simultaneously with the laser projector 112, intermittently with the laser projector 112, or before and after illumination with the laser projector 112. In one example, the secondary illumination system 122 illuminates the ply 20 prior to the operator initiating a detection sequence. In this manner, the computer 24 is provided an indication of where contamination may be on the ply 20 by the photogrammetry assembly 114 detects fluorescence. Therefore, the laser projector 112 may begin its projection directed toward the where the contamination is preliminarily detected on the ply 20.

Still further, the detection system 120 includes secondary camera 124 in like manner as set forth above. The secondary camera 124 either signals the computer 24 a preliminary location of the contamination 24 or detects and exact location of the contamination 24 by detecting fluorescence generated by the laser projector 112, the secondary illuminator 122, or combinations thereof. In this manner the secondary camera includes a lens 126 and a shutter 128 that is coordinated with illumination in a similar manner as set forth above to selectively allow light to reach a sensor 115. While the shutter 128 is represented as a mechanical shutter merely for exemplary purposes, it should be understood that the shutter 128 may also be an electronic shutter capable of rapid discrimination of light transmission to the sensor 115 commensurate the rate of flash or pulse from the illumination source.

Figure 6:
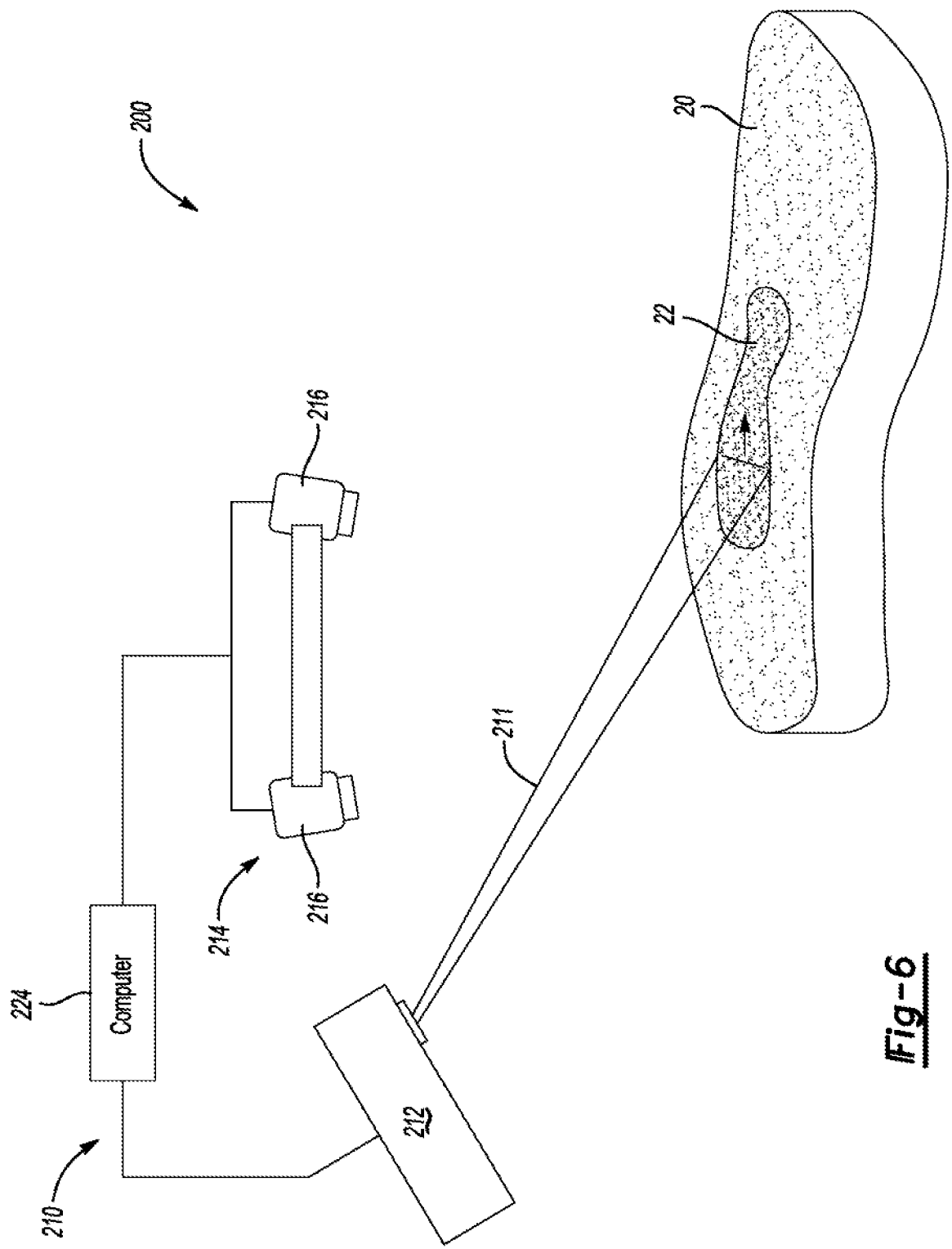
FIG. 6 shows a schematic of a third embodiment of the invention of the present application using only a laser projector.

A still further embodiment of the invention of the present application is generally shown at 200 in FIGS. 6 and 7. The second alternate embodiment 200 relies solely on an optical layup laser projection system 210 similar to the system disclosed in U.S. Pat. No. 9,200,899. The projection system 210 includes a laser projector 212 and a photogrammetry assembly 214. As set forth above, the optical layup system 210 projects laser templates upon an assembly tool or workpiece to provide an operator a location at which each sequential piece of ply is to be placed. The photogrammetry assembly 114 locates the assembly tool or workpiece and signals the computer 224 where to project the laser template based upon computer aided design (CAD) models. The photogrammetry assembly 114 includes one or more photogrammetry cameras 216 and sensor 226 that can also detect fluorescence when contamination is illuminated.

The laser projector 212 projects a green laser beam 211 toward a location of the ply as set forth above. In one embodiment, the laser beam 211 includes a line shaped focus to cover more surface area upon each pass of the scan. As also set forth above, excitation of the fluorescent material by the green laser beam 211 enables the cameras 216 of the photogrammetry assembly 214 to distinguish the contamination 22 from the ply 20. In addition, the photogrammetry assembly 214 identifies a location of the contamination 22 through triangulation of the fluorescence in a manner similar to identifying a location of a retro-reflector (not shown) explained further in U.S. Pat. No. 9,200,899. The photogrammetry assembly then signals the location of the contamination 24 to the computer 23.

Figure 3:
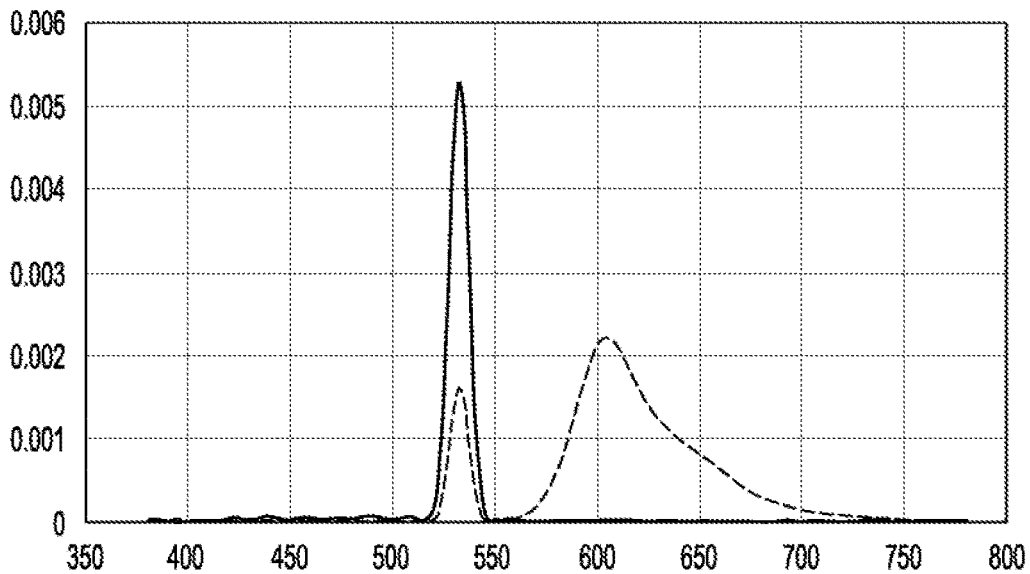
FIG. 3 shows a comparison of illumination of fluorescent material and non-fluorescent material with a green laser having ambient light subtracted.

Once the contamination 22 has been located, the laser projector 212 outlines the location of the contamination 22 by scanning a ring or box 218 around the contamination 24. The laser projector 212 also, optionally, continues to illuminate the contamination so that the photogrammetry assembly 214 can continue to monitor for fluorescence. Once the operator removes the contamination the photogrammetry assembly 214 no longer detects fluorescence and the laser projector 212 terminates scanning the box 218 around the area the fluorescence was originally detected. The photogrammetry cameras 216 include sensors 226 that are adapted to selectively filter ambient light so that fluorescence detection is achieved as represented in FIG. 3.

The steps of the method of detecting contamination are now explained. The description below is merely exemplary and not intended to be limiting as the various uses of the assembly 10, 100, 200 of the present invention. The operator first orients the piece of ply 20 so that the backing material faces the detection assembly 10, 100, 200. The detection assembly 10, 100, 200 optionally scans the backing material to scan a bar code (not shown) on the backing paper to verify the correct ply 20 has been selected correlating to a pre-programmed sequence of assembly steps. After verification, the operator removes the backing material. The detection sequence is then initiated by the operator in a manner as set forth above and the detection system begins to verify all of the material has been separated from the ply 20. If any amount of fluorescence is detected, the computer 24 signals a monitor to identify the location of the contamination to the operator. The monitor generates an augmented image of the ply 20 upon interaction with the assembly 10, 100, 200 as described in fuller detail in co-pending U.S. patent application Ser. No. 15/058,867, the contents of which are incorporated herein by reference. The assembly 10, 100, 200 continues the detection sequence until no further fluorescence is detected. Once no further fluorescence is detected, a process log programmed into to the computer 24 or signaled to a cooperating computer records the piece of ply 20 corresponding to the detected bar code is contamination free. Recordation in the process log assists in preventing operator error.

When the detection assembly 120 is integrated with optical layup laser projection system 110 the assembly 120 and system 110 are aligned to a common coordinate system as established by the photogrammetry assembly 114, 214 or equivalent. Thus, the detection system 120 may be programmed to verify no foreign material or contamination 22 is present prior to placement of the piece of ply 20 by illuminating the layup prior to placement. Detection is achieved in the entire field of view of the secondary camera 124 or the photogrammetry system 114, 214. Detection of contamination 22 in non-critical locations with the field of view is optionally discounted while simultaneously assuring no contamination is remaining in the area the piece of ply 20 is to be placed. Still further, the optical templating system 110 is capable of isolating the location of detected contamination 22 by way of the laser projectors 112 projecting upon the relevant area of the layup.

The invention has been described in an illustrative manner, and it is to be understood that the terminology that has been used is intended to be in the nature of words of description rather than of limitation. Obviously, many modifications and variations of the present invention are possible in light of the above teachings. It is therefore to be understood that within the specification, the reference numerals are merely for convenience, and are not to be in any way limiting, and that the invention may be practiced otherwise than is specifically described. Therefore, the invention can be practiced otherwise than is specifically described within the scope of the intended claims.

What is claimed is:

1. A method of detecting a presence of foreign material in a ply, comprising the steps of:
    treating a source of foreign material with a fluorescent indicator having a peak fluorescence wavelength disposed within a fluorescent wavelength band;
    separating the source of foreign material from the ply;
    providing an illumination source including a peak illumination wavelength being outside the wavelength band of the fluorescent indicator for illuminating the ply whereby the ply reflects light at a wavelength outside the fluorescent wavelength band when illuminated by the illumination source;
    providing a sensor for detecting illumination of the ply and fluorescent indicator included in the foreign material disposed upon the ply; and
    illuminating the ply using the illumination source and identifying differences in light reflected from the ply and fluorescence of the indicator disposed in the foreign material thereby identifying existence of the foreign material in the ply.

2. The method set forth in claim 1, further including a step of filtering light from the illumination source from the sensor.

3. The method set forth in claim 1, wherein said step of providing an illumination source is further defined by providing one of a green laser and a light emitting diode.

4. The method set forth in claim 1, wherein said step of identifying differences in light reflected from the ply and fluorescence of the indicator disposed in the foreign material is further defined by detecting fluorescence having a wavelength between 590 nm and 625 nm.

5. The method set forth in claim 1, wherein said step of identifying differences in light reflected from the ply and fluorescence of the indicator disposed in the foreign material is further defined by detecting fluorescence having a peak wavelength of about 606 nm.

6. The method set forth in claim 1, further including a step of interleaving images of the ply without illumination by a light source with images of the ply with illumination by the light source for subtracting illumination by ambient light.

7. The method set forth in claim 1, further including a step of providing a monitor for receiving a signal from the sensor thereby generating an image identifying a location of the fluorescent contamination on the ply.

8. The method set forth in claim 1, wherein said step of illuminating the ply is further defined by a laser projector continuously illuminating the ply until the fluorescing contamination is separated.

9. The method set forth in claim 1, further including a step of recording verification all fluorescent contamination has been separated from a ply.

10. The method set forth in claim 1, further including a step of the illumination source scanning an indicator upon the ply for identifying a location of the contamination.

11. The method set forth in claim 1, further including a step of providing an optical layup projection system for locating an area of interest on a layup.

12. The method set forth in claim 11, further including a step of identifying an area of interest and providing a laser projector for scanning illumination as directed by the optical layup projection system and signaling a camera the location for detection of illumination for identifying contamination.

13. The method set forth in claim 12, further including a step of distinguishing a critical area of interest for detecting contamination from a non-relevant area where contamination is non-critical.

* * * * *